United States Patent
Kira et al.

(10) Patent No.: US 8,272,955 B2
(45) Date of Patent: Sep. 25, 2012

(54) COMPUTER-READABLE STORAGE MEDIUM HAVING STORED THEREON GAME PROGRAM, GAME APPARATUS, AND GAME CONTROL METHOD

(75) Inventors: Satoshi Kira, Kyoto (JP); Mikito Ichikawa, Shinjuku-ku (JP)

(73) Assignee: Nintendo Co., Ltd., Kyoto (JP)

( * ) Notice: Subject to any disclaimer, the term of this patent is extended or adjusted under 35 U.S.C. 154(b) by 248 days.

(21) Appl. No.: 12/749,852

(22) Filed: Mar. 30, 2010

(65) Prior Publication Data

US 2011/0165940 A1 Jul. 7, 2011

(30) Foreign Application Priority Data

Jan. 7, 2010 (JP) .................. 2010-002092

(51) Int. Cl.
*A63F 9/24* (2006.01)
(52) U.S. Cl. .......................... 463/31; 463/32
(58) Field of Classification Search ............ 463/31, 463/32
See application file for complete search history.

(56) References Cited

U.S. PATENT DOCUMENTS

| | | | |
|---|---|---|---|
| 2002/0037764 A1* | 3/2002 | Anderson et al. ............... | 463/16 |
| 2008/0311984 A1* | 12/2008 | Mai ................. | 463/31 |
| 2009/0093314 A1 | 4/2009 | Ichikawa | |

FOREIGN PATENT DOCUMENTS

JP 2009-089851 4/2009

OTHER PUBLICATIONS

"Bubble Bobble also featuring Rainbow Islands" game manual, Taito Aklaim, pp. 1-10.*
Maboshi Arcade Game, http://wii.ign.com/articles/942/942330p1.html, developed by Nintendo—Mindware Corp; released Dec. 29, 2008; Game Reviewed by IGN Jan. 7, 2009.*
"Bubble Bobble also featuring Rainbow Islands" game manual, Taito Aklaim, for PlayStation, pp. 1-10, released Sep. 30, 1996.*
"New Super Mario Brothers, Wii" Manual. Nintendo Co., Ltd., pp. 23-25; The release date of "New Super Mario Brothers, Wii" game software is Dec. 3, 2009 (Partial Translation).

* cited by examiner

*Primary Examiner* — David L Lewis
*Assistant Examiner* — Shauna-Kay Hall
(74) *Attorney, Agent, or Firm* — Nixon & Vanderhye PC

(57) ABSTRACT

Displayed on a predetermined display device is a play screen on which a virtual game space is rendered, the virtual game space containing a character item indicating a predetermined character and a player object. Also displayed is a character string object screen on which character string objects are rendered, each of the character string objects formed as a combination of the character items displayed on the play screen. When the player object has obtained a character item, a process is performed onto the same character as the obtained character item, the process indicating that the character item has been obtained is performed, the same character being among characters of character strings displayed on the character string object screen. When all constituent characters of a character string object have been obtained, effect generating process predefined as a game effect corresponding to the character string object is performed.

14 Claims, 14 Drawing Sheets

330

| ID | EFFECT TYPE DATA | IN-EFFECT FLAG | CONSTITUENT CHARACTER STRING DATA | EFFECT CONTENT DEFINITION DATA |
|---|---|---|---|---|
| 01 | INSTANT ACTIVATION · CONTINUING | OFF | RADAR | ...... |
| 02 | MANUAL ACTIVATION · TEMPORARY | OFF | MISSILE | ...... |
| 03 | INSTANT ACTIVATION · CONTINUING | OFF | PUSH | ...... |
| 04 | MANUAL ACTIVATION · TEMPORARY | OFF | IGNITE | ...... |
| 05 | INSTANT ACTIVATION · TEMPORARY | OFF | ZAPALL | ...... |

| ID | 01 | | | | | 02 | | | | | | | 03 | | | | | | 04 | | | | | | | | 05 | | | | | |
|---|---|---|---|---|---|---|---|---|---|---|---|---|---|---|---|---|---|---|---|---|---|---|---|---|---|---|---|---|---|---|---|
| CONSTITUENT CHARACTER DATA | R | A | D | A | R | M | I | S | S | I | L | E | P | U | S | H | I | G | N | I | T | E | Z | A | P | A | L | L |
| ACQUISITION FLAG | O | O | O | O | O | O | O | O | O | O | O | O | O | O | O | O | O | O | O | O | O | O | O | O | O | O | O | O |

3321 — ID
3322 — CONSTITUENT CHARACTER DATA
3323 — ACQUISITION FLAG

COMPUTER-READABLE STORAGE MEDIUM HAVING STORED THEREON GAME PROGRAM, GAME APPARATUS, AND GAME CONTROL METHOD

CROSS REFERENCE TO RELATED APPLICATION

The disclosure of Japanese Patent Application No. 2010-2092, filed on Jan. 7, 2010, is incorporated herein by reference.

BACKGROUND AND SUMMARY

1. Technical Field

The technology presented herein relates to a computer-readable storage medium having stored thereon a game program executed by a computer of a game apparatus which causes a player object to move based on an operation by a player, and more particularly, relates to processing of obtaining an item which appears during the game.

2. Description of the Background Art

Conventionally, there is a known game which is executed by a game apparatus and the like and in which it is possible to strengthen a player object by obtaining items that appear in a virtual game space (for example, "New Super Mario Brothers, Wii" Manual, Nintendo Co., Ltd., pp. 23-25). For example, in a screen-scrolling type action game and the like, acquisition of an item enables a player object to perform a long distance attack, to jump more highly, or the like, thereby enhancing the ability of the player object. In this manner, a player can advance the game advantageously.

However, in such a game, when the player object merely obtains an item appearing in the game, the effect corresponding to the obtained item is activated immediately. In other words, in order to strengthen the player object, it is sufficient to obtain an item that has appeared, and thus, the act of "obtaining an item" itself has a low strategic feature.

SUMMARY

Therefore, a feature of the example embodiments presented herein is to provide a game program and a game apparatus that can provide a new manner of enjoying the game, by providing the act of acquisition of an item with a strategic feature.

The present embodiment has the following features to attain the above.

A first aspect of the present embodiment is directed to a computer-readable storage medium having stored thereon a game program executed by a computer of a game apparatus which causes a player object to move based on an operation by a player, the game program causing the computer to function as play screen display means, character string object screen display means, acquisition state reflection means, character string completion determination means, and effect process performing means. The play screen display means displays on a predetermined display device a play screen on which a virtual game space is rendered, the virtual game space containing a character item indicating a predetermined character and the player object. The character string object screen display means displays a character string object screen on which character string objects are displayed, each of the character string objects formed in advance as a combination of characters indicated by the character items displayed on the play screen. The acquisition state reflection means performs, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen. The character string completion determination means determines, with respect to one of the character string objects displayed on the character string object screen, whether or not all constituent characters thereof have been obtained, the constituent characters being characters forming said one of the character string objects. The effect process performing means performs, when the character string completion determination means has determined that all the constituent characters of said one of the character string objects have been obtained, an effect generating process that is predefined as a game effect corresponding to said one of the character string objects.

According to the first aspect, it is possible, for example, to provide the act of acquisition of an item with a strategic feature, thereby allowing enhancement of the entertaining feature of the game.

In a second aspect, the constituent characters of each of the character string objects include a common character which is a character used in common in at least two of the character string objects. When the player object has obtained one of the character items that indicates the common character, the acquisition state reflection means performs, onto one of the common characters that correspond to said one of the character items obtained, a process for indicating that the character indicated by said one of the character items has been obtained, in an order predefined based on positions of the character string objects arranged on the character string object screen.

According to the second aspect, it is possible to change the difficulty level of collecting the constituent characters of each of the character string objects, thereby allowing further enhancement of the entertaining feature of the game.

In a third aspect, the character string objects are arranged in a longitudinal direction on the character string object screen. When the player object has obtained said one of the character items that indicates the common character, the acquisition state reflection means performs, onto said one of the common characters that correspond to said one of the character items obtained, a process for indicating that the character indicated by said one of the character items has been obtained, in an order in which the common characters are processed one by one from the top to the bottom of the character string object screen.

According to the third aspect, it is possible to provide a feature in which the upper a character string object is located, the easier it becomes to collect the constituent characters thereof, and the lower a character string object is located, the more difficult it becomes to collect the constituent characters thereof. This allows further enhancement of the strategic feature in the manner of obtaining the character items, thereby further allowing enhancement of the entertaining feature of the game.

In a fourth aspect, the character string objects are associated with a process having a definition that the lower one of the character string objects is located on the character string object screen, the stronger game effect said one of the character string objects has. Here, the stronger game effect means, for example, an effect that makes the player more advantageous, such as a game effect having a broader effective range (a game effect that is effective only the vicinity of the player object, a game effect that is effective over the whole screen, and the like), a game effect that is effective on a greater number of objects (three enemy objects come under the game effect, ten enemy objects come under the game effect, and the like), and a game effect that gives a greater damage.

According to the fourth aspect, the more difficult it is to collect the constituent characters of a character string object, the stronger game effect the character string object has. Accordingly, it is possible to enhance the entertaining feature of the game.

In a fifth aspect, when the player object contacts, by overlapping, adjoining, or the like, one of the character items in the virtual game space, the acquisition state reflection means performs a process for indicating that the character indicated by said one of the character items has been obtained.

According to the fifth aspect, it is possible to obtain a character item when the player object contacts the character item. Accordingly, with respect to the acquisition operation of a character item, it is possible to provide operability that is more intuitive and without an uncomfortable feeling.

In a sixth aspect, the character string object screen display means always displays the character string object screen.

In a seventh aspect, the character string object screen display means always displays the character string object screen on a display device different from the display device on which the play screen is displayed.

According to the sixth and the seventh aspects, the player is allowed to easily understand the acquisition state of the character items.

In an eighth aspect, the acquisition state reflection means performs a process for changing a display state of the same character as the character indicated by said one of the character items that has been obtained by the player object, the same character being among the constituent characters displayed on the character string object screen, the process being performed as the process for indicating that the character indicated by said one of the character items has been obtained.

In a ninth aspect, the acquisition state reflection means performs a process for changing a color indicating that the same character as the character indicated by said one of the character items that has been obtained by the player object, the same character being among the constituent characters displayed on the character string object screen, the process being performed as the process for indicating that the character indicated by said one of the character items has been obtained.

According to the eighth and the ninth aspects, the player is allowed to intuitively understand the acquisition state of the character items.

In a tenth aspect, each of the character string objects is associated with one of instant generation information and manual generation information, the instant generation information indicating that the effect generating process is performed immediately after the character string completion determination means has determined that all the constituent characters of one of the character string objects have been obtained, the manual generation information indicating that the effect generating process is performed when a predetermined operation is performed by the player after the character string completion determination means has determined that all the constituent characters of one of the character string objects have been obtained. The effect process performing means determines, when the character string completion determination means has determined that all the constituent characters of said one of the character string objects have been obtained, whether information associated with said one of the character string objects is the instant generation information or the manual generation information. The effect process performing means immediately performs the effect generating process in a case where the information is the instant generation information, and performs, in a case where the information is the manual generation information, the effect generating process when a predetermined operation is performed by the player.

According to the tenth aspect, it is possible to provide individuality to each of the character string objects, thereby allowing further enhancement of the entertaining feature of the game.

In an eleventh aspect, after the character string completion determination means has determined that all the constituent characters of said one of the character string objects have been obtained, in the case where the information associated with said one of the character string objects is the manual generation information, when all constituent characters of another one of the character string objects different from said one of the character string objects have been obtained before the predetermined operation is performed by the player, the effect process performing means performs the effect generating process corresponding to said another one of the character string objects.

According to the eleventh aspect, it is possible to enhance the strategic feature of the character item acquisition, thereby allowing enhancement of the entertaining feature of the game.

In a twelfth aspect, each of the character string objects is associated with one of a first effect process and a second effect process, the first effect process defined as a process whose game effect continues, after being generated, until all constituent characters of another one of the character string objects have been obtained, the second effect process defined as a process whose game effect, after being generated, does not continue and disappears soon. The effect process performing means performs one of the first effect process and the second effect process as the effect generating process corresponding to said one of the character string objects, all the constituent characters thereof having been obtained.

According to the tenth to the twelfth aspects, it is possible to provide individuality to each of the character string objects, thereby allowing further enhancement of the entertaining feature of the game.

A thirteenth aspects is directed to a game apparatus which causes a player object to move based on an operation by a player, the game apparatus comprising play screen display means, character string object screen display means, acquisition state reflection means, character string completion determination means, and effect process performing means. The play screen display means displays on a predetermined display device a play screen on which a virtual game space is rendered, the virtual game space containing a character item indicating a predetermined character and the player object. The character string object screen display means displays a character string object screen on which character string objects are displayed, each of the character string objects formed in advance as a combination of characters indicated by the character items displayed on the play screen. The acquisition state reflection means performs, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen. The character string completion determination means determines, with respect to one of the character string objects displayed on the character string object screen, whether or not all constituent characters thereof have been obtained, the constituent characters being characters forming said one of the character string objects. The effect process performing means performs, when the character string completion determination means has determined that all the constituent characters of said one of the character string objects have been obtained, an effect generating process that is predefined as a game effect corresponding to said one of the character string objects.

A fourteenth aspect is directed to a game control method for controlling a game which causes a player object to move based on an operation by a player, the method comprising play screen display means, character string object screen display means, acquisition state reflection means, character string completion determination means, and effect process performing means. The play screen display means displays on a predetermined display device a play screen on which a virtual game space is rendered, the virtual game space containing a character item indicating a predetermined character and the player object. The character string object screen display means displays a character string object screen on which character string objects are displayed, each of the character string objects formed in advance as a combination of characters indicated by the character items displayed on the play screen. The acquisition state reflection means performs, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen. The character string completion determination means determines, with respect to one of the character string objects displayed on the character string object screen, whether or not all constituent characters thereof have been obtained, the constituent characters being characters forming said one of the character string objects. The effect process performing means performs, when the character string completion determination means has determined that all the constituent characters of said one of the character string objects have been obtained, an effect generating process that is predefined as a game effect corresponding to said one of the character string objects.

According to the thirteenth and fourteenth aspects, the same effect as that of the first aspect can be obtained.

Therefore, according to the present embodiment, it is possible to provide a game program and a game apparatus that can provide a new manner of enjoying the game, by providing the act of acquisition of an item appearing in the game with a strategic feature.

These and other, features, aspects and advantages of the present embodiment will become more apparent from the following detailed description of the present embodiment when taken in conjunction with the accompanying drawings.

BRIEF DESCRIPTION OF THE DRAWINGS

FIG. 14 shows an example of a configuration of an acquisition state table 332;

DESCRIPTION OF THE PREFERRED EMBODIMENTS

Hereinafter, an embodiment will be described with reference to the drawings. Note that the present technology is not limited to this embodiment.

Figure 1:
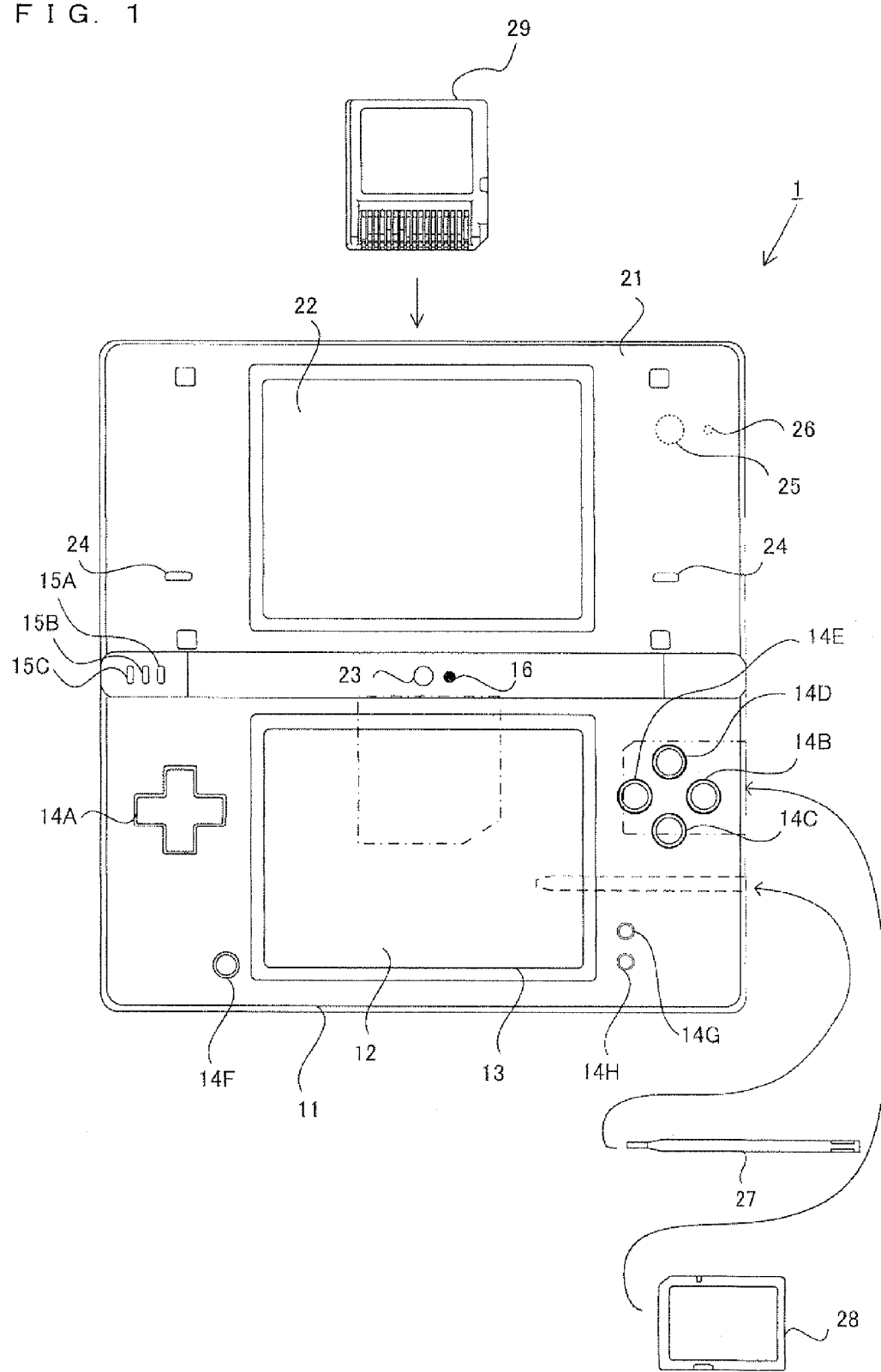
FIG. 1 is an external view of a game apparatus 1 for executing a game program of the present embodiment.

FIG. 1 is an external view of the game apparatus 1 for executing a game program of the present embodiment. In FIG. 1, the game apparatus 1 is a foldable hand-held game apparatus in an opened state. The game apparatus 1 is configured to have such a size as to be held by a user with both hands or one hand in the opened state. For convenience, the following description assumes that the long side of the sheet of the drawings corresponds to the vertical direction.

The game apparatus 1 includes a lower housing 11 and an upper housing 21. The lower housing 11 and the upper housing 21 are connected to each other so as to be capable of being opened or closed (foldable). In the example of FIG. 1, the lower housing 11 and the upper housing 21 are each formed in a plate-like shape of a horizontally long rectangle, and foldably connected to each other at long side portions thereof. Unusually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. Note that although an LCD is used as a display device provided in the game apparatus 1 in the present embodiment, any other display devices such as a display device using an EL (Electro Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14K, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning on or off the power of the game apparatus 1. In the example shown in FIG. 1, the direction input button 14A and the power button 14F are provided on the inner main surface of the lower housing 11 and on one of a left side and a right side (on the left side in FIG. 1) of the lower LCD 12 provided in the vicinity of the center of the inner main surface of the lower housing 11. Further, the operation buttons 142 to 14E, the start button 14G, and the select button 14H are provided on the inner main surface of the lower housing 11 and on the other of the left side and the right side (on the right side in FIG. 1) of the lower LCD 12. The direction input button 14A, the operation buttons 142 to 14E, the start button 14G, and the select button 14H are used for performing various operations on the game apparatus 1.

Note that the operation buttons 14I to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the game apparatus 1. In addition, the volume button 14K is provided on a left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted on the lower LCD 12 so as to cover the screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and that of the lower LCD 12 may not necessarily be the same with each other. In a right side surface of the lower housing 11, an insertion opening (indicated by a dashed line in FIG. 1) is provided. The insertion opening is capable of accommodating a touch pen 27 which is used for performing an operation on the touch panel 13. Although an input onto the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) is formed for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is formed for accommodating a cartridge 29. Inside the insertion opening, a connector (not shown) is provided for electrically connecting the game apparatus 1 to the cartridge 29. The cartridge 29 is a storage medium storing a game program and the like, and detachably mounted in the insertion opening provided in the lower housing 11.

Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user roles of the operation buttons 14A to 14K and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface opposite to the surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 42 shown in FIG. 2) is accommodated as a voice input device. In the inner main surface in the vicinity of the connection portion, a microphone hole 16 is formed to allow the microphone 42 to detect sound outside the game apparatus 1. The accommodating position of the microphone 42 and the position of the microphone hole 16 are not necessarily in the connection portion. For example, the microphone 42 may be accommodated in the lower housing 11, and the microphone hole 16 may be formed in the lower housing 11 so as to correspond to the accommodating position of the microphone 42.

In the outer main surface of the upper housing 21, a fourth LED 26 (indicated by a dashed line in FIG. 1) is mounted. The fourth LED 26 is lit up at a time when photographing is performed (when the shutter button is pressed) with the outer camera 25. Further, the fourth LED 26 is lit up while a moving picture is being taken by the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on left and right sides, respectively, of the upper LCD 22 provided in the vicinity of the center of the inner main surface of the upper housing 21. The speakers are accommodated in the upper housing 21 and at the back of the sound holes 24. The sound holes 24 are for releasing sound from the speakers to the outside of the game apparatus 1 therethrough.

As described above, the inner camera 23 and the outer camera 25 which are components for taking an image, and the upper LCD 22 which is display means for displaying, for example, an operation explanation screen at the time of photographing are provided in the upper housing 21. On the other hand, the input devices for performing an operation input on the game apparatus 1 (the touch panel 13 and the buttons 14A to 14K), and the lower LCD 12 which is display means for displaying the game screen are provided in the lower housing 11. Accordingly, when using the game apparatus 1, the user can hold the lower housing 11 and perform an input on the input device while seeing a taken image (an image taken by one of the cameras) displayed on the lower LCD 12.

Figure 2:
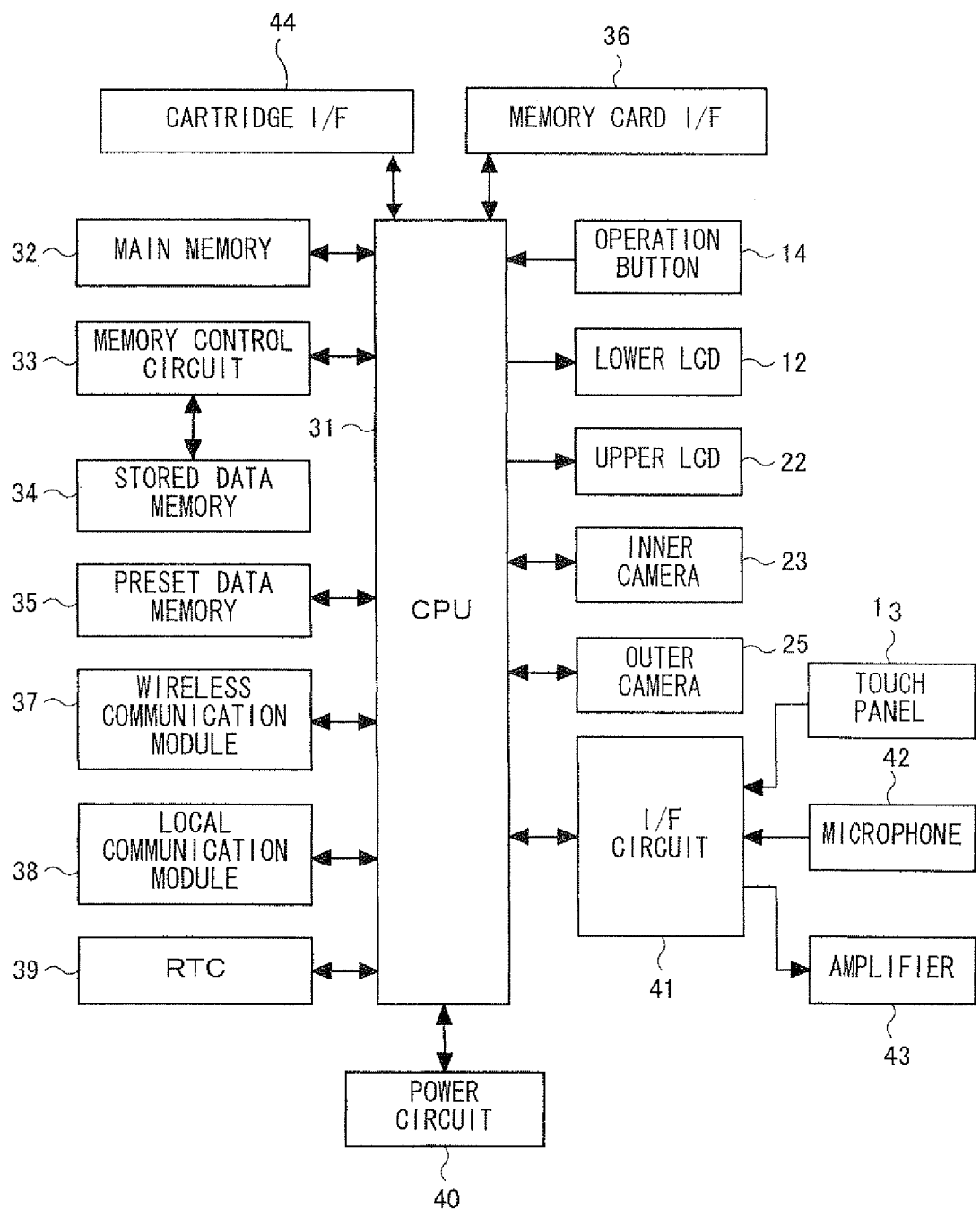
FIG. 2 is a block diagram showing an example of an internal configuration of the game apparatus 1.

Now, an internal configuration of the game apparatus 1 is described with reference to FIG. 2. FIG. 2 is a block diagram showing an example of the internal configuration of the game apparatus 1.

As shown in FIG. 2, the game apparatus 1 includes electronic components including a CPU 31, a main memory 32, a memory control circuit 33, a stored data memory 34, a preset data memory 35, a memory card interface (memory card I/F) 36 and a cartridge I/F 44, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g. the stored data memory 34) within the game apparatus 1 or in the memory card 28 and/or the cartridge 29, and the CPU 31 performs below-described game processing by executing the predetermined program. Note that a program executed by the CPU 31 may be stored in advance in a memory within the game apparatus 1, may be obtained from the memory card 28 and/or the cartridge 29, or may be obtained from another apparatus by means of communication with said another apparatus. For example, a program may be obtained by means of download via the Internet from a predetermined server, or may be obtained by downloading a predetermined program stored in a stationary game apparatus through communication therewith.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used in the game processing, and also stores a program obtained from the outside (the memory cards 28 and the cartridge 29, another apparatus, and the like). In the present embodiment, for example, a PSRAM (Pseudo-SRAM) is used as the main memory 32. The stored data memory 34 is storage means for storing a program executed by the CPU 31, data of images taken by the inner camera 23 and the outer camera 25, and the like. The stored data memory 34 is constructed of a nonvolatile storage medium, for example, a NAND flash memory, in the present embodiment. The memory control circuit 33 is a circuit for controlling reading of data from the stored data memory 34 or writing of data to the stored data memory 34 in accordance with an instruction from the CPU 31. The preset data memory 35 is storage means for storing data (preset data) of various parameters and the like which are set in advance in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads data from the memory card 28 mounted on the connector or writes data to the memory card 28 in accordance with an instruction from the CPU 31. In the present embodiment, data of images taken by the outer camera 25 is written to the memory card 28, and image data stored in the memory card 28 is read from the memory card 28 to be stored in the stored data memory 34.

The cartridge I/F 44 is connected to the CPU 31. The cartridge I/F 44 reads out data from the cartridge 29 mounted to the connector or writes data to the cartridge 29 in accordance with an instruction from the CPU 31. In the present embodiment, an application program executable by the game apparatus 1 is read out from the cartridge 29 to be executed by the CPU 31, and data regarding the application program (e.g. saved data and the like) is written to the cartridge 29.

The wireless communication module 37 functions to connect to a wireless LAN device, for example, by a method conformed to the standard of IEEE 802.11.b/g. The local communication module 38 functions to wirelessly communicate with a game apparatus of the same type by a predetermined communication method. The wireless communication module 37 and the local communication module 38 are connected to the CPU 31. The CPU 31 is capable of receiving data from and transmitting data to another apparatus via the Internet using the wireless communication module 37, and capable of receiving data from and transmitting data to another game apparatus of the same type using the local communication module 38.

The RTC 39 and the power circuit 40 are connected to the CPU 31. The RTC 39 counts a time, and outputs the time to the CPU 31. For example, the CPU 31 is capable of calculating a current time (date) and the like based on the time counted by the RTC 39. The power circuit 40 controls electric power from a power supply (typically, a battery accommodated in the lower housing 11) of the game apparatus 1 to supply the electric power to each electronic component of the game apparatus 1.

The game apparatus 1 includes the microphone 42 and an amplifier 43. The microphone 42 and the amplifier 43 are connected to the I/F circuit 41. The microphone 42 detects voice produced by the user toward the game apparatus 1, and outputs a sound signal indicating the voice to the I/F circuit 41. The amplifier 43 amplifies the sound signal from the I/F circuit 41, and causes the speakers (not shown) to output the sound signal. The I/F circuit 41 is connected to the CPU 31.

The touch panel 13 is connected to the I/F circuit 41. The I/F circuit 41 includes a sound control circuit for controlling the microphone 42 and the amplifier 43 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating coordinates of a position at which an input is performed on an input surface of the touch panel 13. The touch panel control circuit reads a signal from the touch panel 13 and generates touch position data every predetermined period of time. The CPU 31 is capable of recognizing a position at which an input is performed on the touch panel 13 by obtaining the touch position data.

An operation button 14 includes the above operation buttons 14A to 14K, and is connected to the CPU 31. The operation button 14 outputs operation data indicating an input state of each of the buttons 14A to 14K (whether or not each button is pressed) to the CPU 31. The CPU 31 obtains the operation data from the operation button 14, and performs processing in accordance with an input performed onto the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

Figure 3:
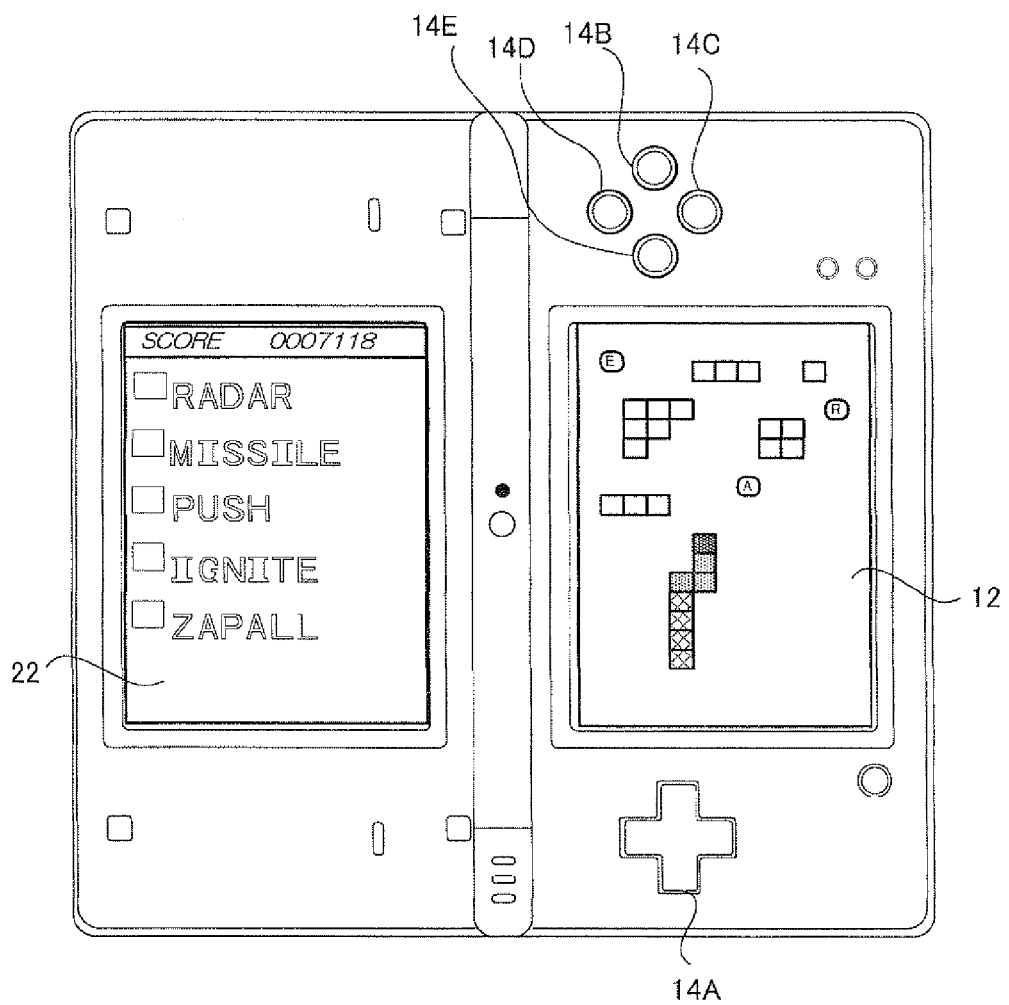
FIG. 3 shows a state of the game apparatus 1 at the time when a game assumed in the present embodiment is played.
Figure 4:
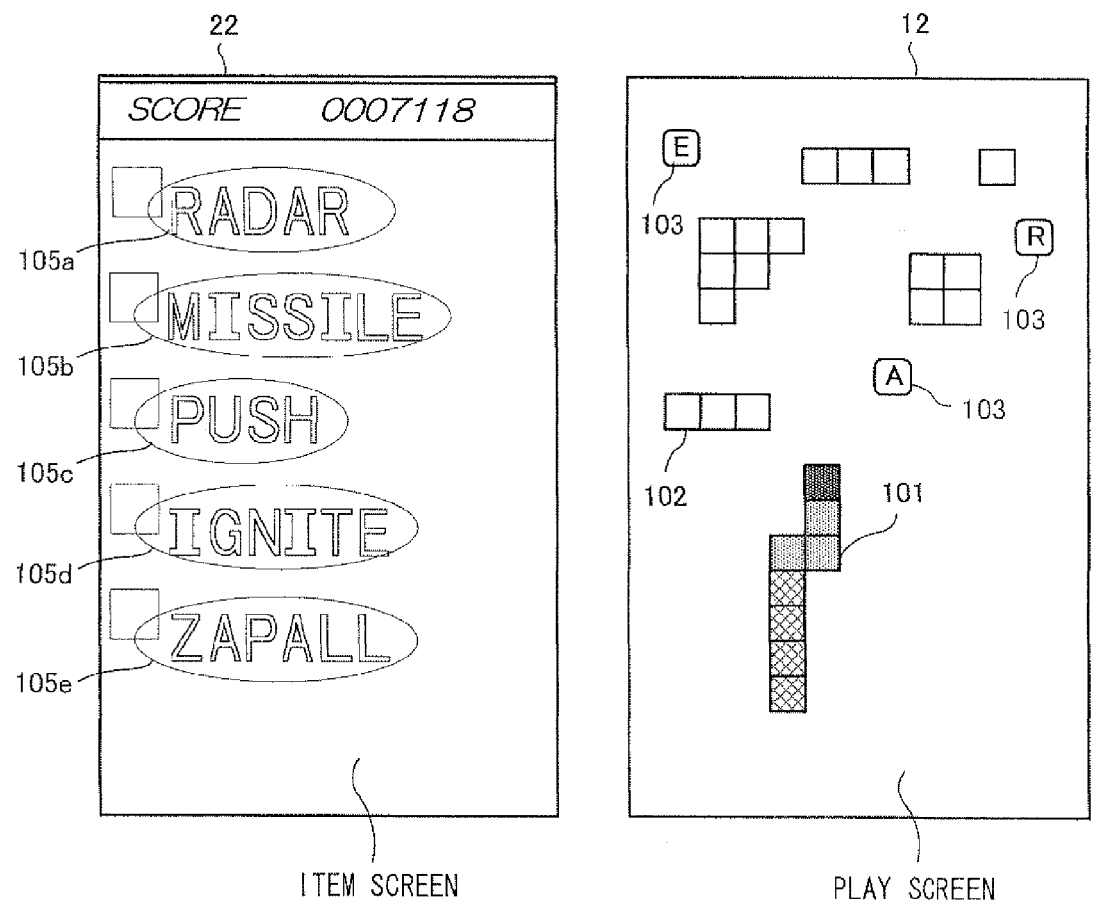
FIG. 4 shows an example of screens of the game assumed in the present embodiment.
Figure 5:
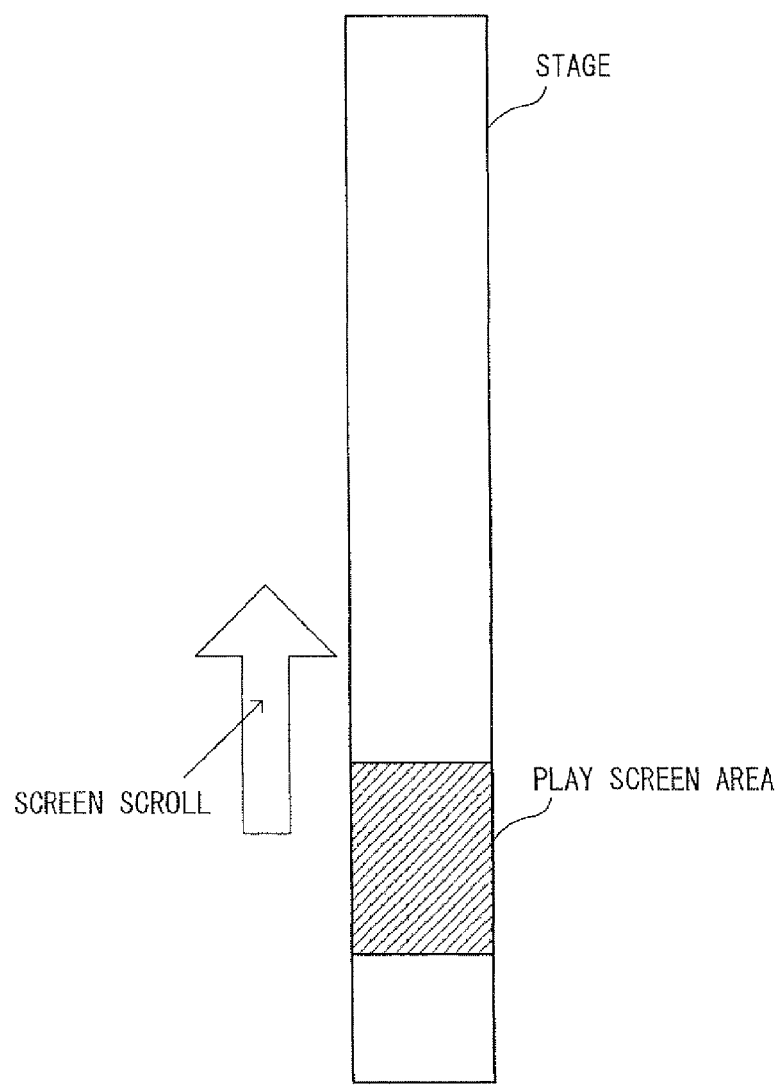
FIG. 5 shows a concept of a virtual space of the game assumed in the present embodiment.

Next, the outline of the game assumed in the present embodiment is described with reference to FIG. 3 to FIG. 11. As shown in FIG. 3, the game assumed in the present embodiment is played on the game apparatus 1 rotated leftward by 90 degrees (such that the longitudinal sides of the screens are aligned with the vertical direction) from the state shown in FIG. 1. FIG. 4 shows an example of screens of the game assumed in the present embodiment. In FIG. 4, on the left screen (upper LCD 22), a screen where a plurality of character string objects 105 are displayed (hereinafter referred to as an item screen) is displayed. On the right screen (lower LCD 12), a screen where a player object 101, a plurality of blocks 102, and a plurality of character items 103 are displayed (hereinafter referred to as a play screen) is displayed. First, the play screen is described. On the play screen, the player object 101 controlled by a player is displayed. The play screen is a screen that is mainly used in a game play. A virtual game space, in which the game is played, is divided into some stages. One stage has, as shown in FIG. 5, for example, an area of several screens extending in a longitudinal direction (the area may be an area of tens of screens depending on a stage). The play screen is used for displaying a part of the game space, and scrolls in the longitudinal direction in accordance with an operation of the player.

Figure 6:
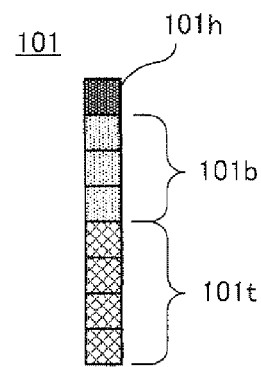
FIG. 6 shows a structure of a player object.

As shown in FIG. 6, the player object 101 includes a head part 101h, a body part 101b, and a tail part 101t. The player can move the head part 101h of the player object 101 in four directions of up, down, left and right directions using the cross button 14A. The movements of the body part 101b and the tail part 101t are controlled such that the body part 101b and the tail part 101t follow the head part 101h (note that the length of the body part 101b and the tail part 101t changes in accordance with the progress of the game). In other words, the movement of the player object 101 is expressed in a snake-like motion.

The present game is a non-real-time game, and is a turn-based game. That is, each time a player moves the player object 101 once, the time in the game advances. Unless the player operates the player object 101, the time in the game does not advance, and thus, for example, the screen does not scroll in the state where no operation is being performed by the player. In other words, when the player object 101 performs an action (some operation is performed), the time in the game advances, and for example, the play screen scrolls upward by the width of one horizontal line. Note that, in a case where a below-described missile is launched or the like, such representation may be provided in real time.

In the present game, each of the body part 101b and the tail part 101t has a role like that of an ignition device. To be specific, when adjoining a block 102, the body part 101b or the tail part 101t is capable of igniting the block 102. After an animation indicating the burning state of the block 102 is shown for a predetermined period of time, the block 102 disappears in the end. In other words, the block 102 has two states, that is, a "non-burning state", which is a state before the block is not ignited, and a "burning state", which is a state where the block is burning. After the "burning state" continues for a predetermined period of time, the block disappears.

On the play screen, character items 103 each indicating a predetermined character also appear in addition to the blocks 102. A character item 103 can be "obtained" when the head part 101h overlaps the character item 103. The character item 103 is not ignited even when the body part 101b or the tail part 101t adjoins the character item 103. Note that the obtained character item 103 is associated with the display content on the item screen. This will be described below.

The present game is a game where, the player advances the player object 101 while burning the blocks 102 in a virtual game space as shown in FIG. 5 (the play screen scrolls in the longitudinal direction as the game advances). As described above, the present game includes a plurality of stages. In each stage, the player object 101 advances upwards, starting at the lower end of the stage. When the player object 101 advances a predetermined distance, the stage is cleared. When a block 102 that has not been completely burned out arrives at the lower end of the play screen, the game session is over (or a failure).

Next, an item screen is described. Character string objects 105a to 105e are displayed and arranged in the longitudinal direction on the item screen shown in FIG. 4. (In the following description, these may be collectively referred to as character string objects 105). Each character string object 105 indicates a "power-up item". Here, the "power-up item" in the present game is not an indispensable item in order to clear the game but an item that allows the player to advance the game advantageously by obtaining the item. Each character string displayed as a character string object 105 is formed in advance as a combination of the characters indicated by the character items 103 that appear in the play screen. In other words, it is configured that all the character items 103 which appear in the play screen are used in these character strings. In the game assumed in the present embodiment, fifteen kinds of character items 103, that is, "A", "D", "E", "G", "H", "I", "L", "M", "N", "P", "R", "S", "T", "U", and "Z", appear in the play screen. A character string object 105 indicates a character string that is formed as a combination of characters selected from these fifteen characters. The player object 101 obtains character items 103 that appear in the play screen so as to collect constituent characters of a character string object. When all the constituent characters of the character string object are collected, it is considered that a "power-up item" indicated by the character string object 105 has been obtained.

Now, characters that form a character string object 105 (hereinafter referred to as constituent characters) are described. Constituent characters include characters, each of which is commonly used in at least two character string objects 105 (hereinafter referred to as a common character). The constituent characters of each character string object 105 include at least one common character. With reference to FIG. 4, the character "A" in "RADAR", which is the character string object 105a, is also used in "ZAPALL", which is the character string object 105e. That is, "A" is included as a common character.

Next, an action when a character item 103 is obtained in the play screen is described. First, when the head part 101h overlaps a character item 103 displayed on the play screen, the character item 103 is obtained. Once the character item 103 is obtained, the color of a constituent character corresponding to the obtained character item 103 changes, the constituent character being one of the constituent characters that form the character string objects 105 displayed on the item screen. This allows the player to recognize that the constituent character has been obtained. Hereinafter, that the color of an obtained character changes is referred to as "a character is filled".

Figure 7:
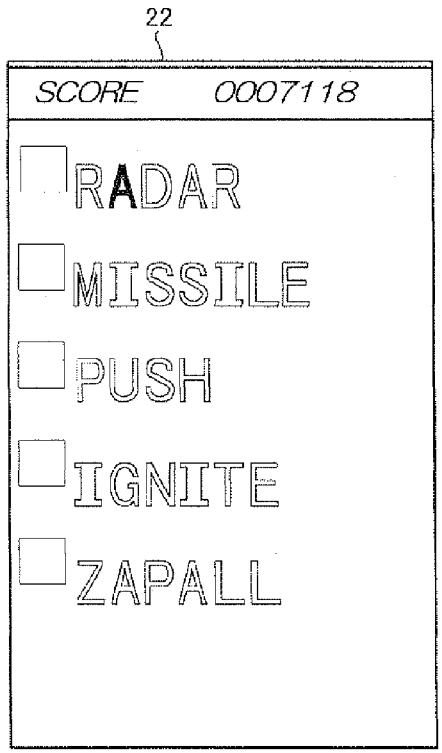
FIG. 7 shows an example of an item screen.
Figure 8:
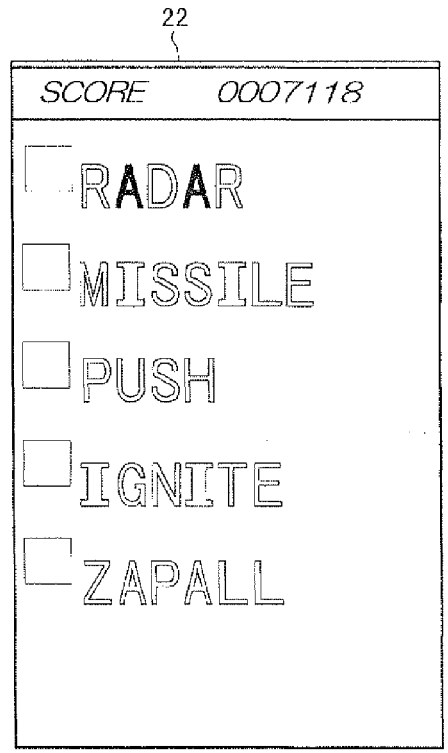
FIG. 8 shows an example of the item screen.
Figure 9:
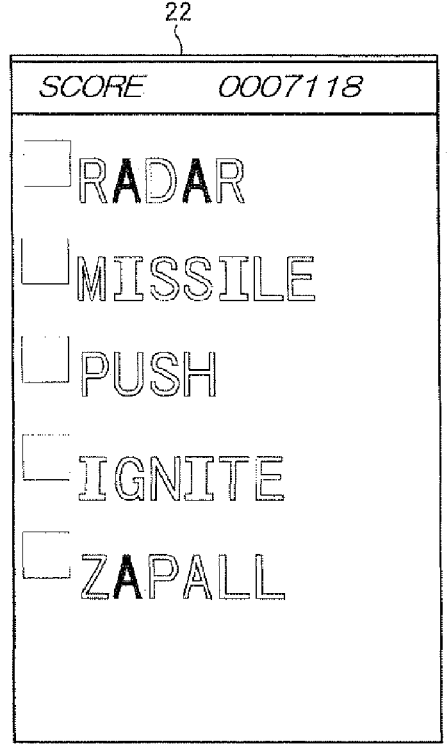
FIG. 9 shows an example of the item screen.
Figure 10:
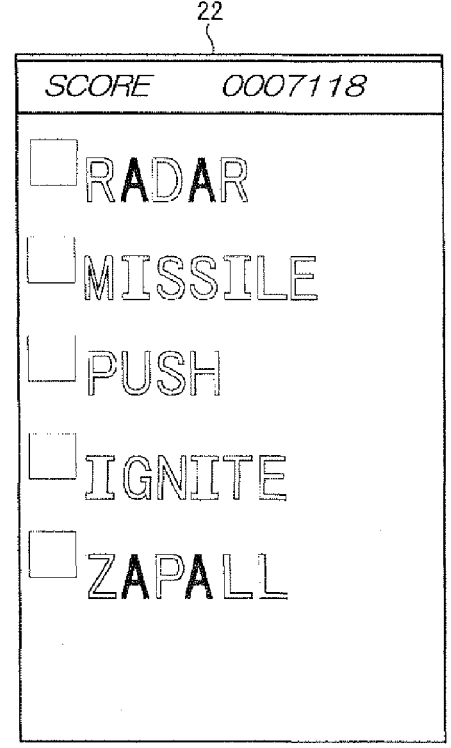
FIG. 10 shows an example of the item screen.

When the character indicated by the obtained character item 103 is a "common character" described above, in the case where a plurality of the same common characters as the obtained common character are included in a character string object 105, the same common characters are filled one by one from the left to the right. Moreover, in the case where a common character is used in different character string objects 105, the constituent characters corresponding to the common character are filled one by one from the top to the bottom of the item screen. With reference to FIG. 7 to FIG. 10, description is given on an exemplary case where four character items 103, each indicating a common character "A", are obtained. First, when a first "A" is obtained, the left "A" in "RADAR" is filled as shown in FIG. 7. Then, the game advances. When another "A" that has appeared next is obtained, the right "A" in "RADAR" is filled as shown in FIG. 8. Thereafter, when a third "A" is obtained, the left "A" in "ZAPALL" is filled as shown in FIG. 9. Thereafter, when a fourth "A" is obtained, the right "A" in "ZAPALL" is filled as shown FIG. 10. In this manner, the common characters within a character string object 105 are filled in order from the left to the right, and the common characters indifferent character string objects 105 are filled in order from the top to the bottom. Accordingly, it is more difficult to fill the constituent characters of the character string objects 105 located in the lower part of the item screen than those of the character string objects 105 located in the upper part of the item screen. (Note that additional adjustment may be provided as a feature of the game. For example, the lower in the item screen a character string object 105 is located, the fewer times the constituent characters (for example, "Z") thereof appear in the item screen.)

Moreover, when a character item 103 is obtained, there may be displayed animation showing, for example, the obtained character item 103 flying to the position of its corresponding constituent character (a character to be filled) in the item screen.

Figure 11:
FIG. 11 shows an example of the item screen.

Next, description is given on an action when all of the constituent characters of a character string object 105 are filled. When all the constituent characters of a character string object 105 are filled (for example, FIG. 11 shows a state where all the constituent characters of "RADAR" are filled), it is considered that the power-up item indicated by the character string object 105 has been obtained. Accordingly, the game is now in a state where the "effect" corresponding to the character string object 105 is activated or can be activated.

As types of activation of the effect, the present game predefines the following three types.

(1) Instant Activation and Continuing Type

In an activation of the instant activation and continuing type, the effect is activated immediately after all the constituent characters are collected. The activated effect continues until the effect of another power-up item is activated. In the present game, "RADAR" and "PUSH" are categorized in this type. To be specific, in the case of "RADAR", a mini-map indicating the whole image of the stage is displayed, for example, in a free space in the right portion of the item screen, and presents the whole structure of the stage to the player. "PUSH" allows the player object to push a block 102 with the head part 101h.

(2) Manual Activation and Temporary Type

In an activation of the manual activation and temporary type, the effect is not activated immediately after all the constituent characters are filled, but activated only after an activation operation is performed by the player. For example, after the constituent characters are filled, when the player presses the operation button 14C, the effect is activated. In addition, the effect finishes instantly (that is, the effect does not continue). In the present game, "MISSILE" and "IGNITE" are categorized in this type. To be specific, "MISSILE" allows the player to fire only one missile by pressing the operation-button 14C. The missile explodes upon hitting a block 102, and therefore, is capable of causing a plurality of the blocks 102 involved in the explosion to disappear. Meanwhile, "IGNITE" is set so as to increase the burning rate of all the blocks 102 when the player presses the operation button 14C to activate the effect of "IGNITE". As a result, it becomes possible to shorten the time period from the ignition of a block 102 to the disappearance thereof.

(3) Instant Activation and Temporary Type

In an activation of the instant activation and temporary type, the effect is activated immediately after all the constituent characters are collected, and the effect finishes instantly. In the present game, "ZAPALL" is categorized in this type. To be specific, "ZAPALL" has an effect of deleting all the blocks 102 and all the character items 103 displayed on the play screen instantly when all the constituent characters of "ZAPALL" are collected.

Note that in the present game, only one power-up item can be held and activated at one time. Accordingly, once the effect of the power-up item corresponding to a character string object 105 is activated, the state of the character string object 105 thereof returns to that when none of the constituent characters thereof are filled (that is, an initial state). For example, in the case of the "instant activation and continuing type" and the "instant activation and temporary type", the effect is activated immediately after all the constituent characters are collected. Therefore, the state of the character string object 105 is initialized almost at the same time when all the constituent characters thereof are collected. Meanwhile, in the case of the "manual activation and temporary type", even if all the constituent characters of a character string object 105 are collected, the effect is not activated unless an activation operation is performed by the player. The state of the character string object 105 is initialized at the time when the activation operation is performed by the player.

Moreover, with respect to the "instant activation and continuing type", the effect disappears at the time when the effect of another power-up item is activated. For example, when "ZAPALL" is obtained while the effect of "PUSH" is effective, the effect of "PUSH" disappears at the same time when "ZAPALL" is obtained, and the effect of "ZAPALL" is activated. Moreover, for example, when "MISSILE", which is of a "manual activation and temporary type", is obtained while the effect of "PUSH" is effective, the effect of "PUSH" disappears at the time when an activation operation of "MISSILE" is performed.

With respect to the "manual activation and temporary type", after all the constituent characters of a character string object 105 are collected and before the player performs an activation operation thereon, if another power-up item is obtained (when all the constituent characters of said another character string object 105 have been collected), the effect of the newly obtained power-up item supercedes the effect of the previously obtained power-up item. For example, in a case where after all the constituent characters of "MISSILE" have been collected and before the operation button 14C is pressed (that is, a missile is not fired), all the constituent characters of "PUSH" are collected, the effect of "MISSILE" disappears (the state of the constituent characters also returns to the initial state at this timing) and the effect of "PUSH" is activated. Moreover, in a case where after all the constituent characters of "MISSILE" have been collected and before the operation button 14C is pressed, all the constituent characters of "IGNITE" are collected, the effect of "MISSILE" disappears (the state of the constituent characters of "MISSILE" also returns to the initial state at this timing). Therefore, when the operation button 140 is pressed after that, a missile is not fired but the effect of "IGNITE" described above is activated.

In the present game, with respect to the arranging order of the character string objects 105 (power-up items) displayed on the item screen, the character string objects 105 are arranged such that the lower a character string object 105 is located in the item screen, the stronger effect (for example, having a broader effect range, being advantageous in the game, and the like) the character string object 105 has. This makes it more difficult to obtain a power-up item having a stronger effect (it is difficult to collect all the constituent characters thereof), thereby enhancing the entertaining feature of the game.

As described above, the present game is configured such that the player can obtain a power-up item by collecting constituent characters one by one until the player has all the constituent characters of a character string object 105 and that a common character is used in a plurality of character string objects 105. Also, the acquisition state of the constituent characters are visually indicated to the player by displaying the item screen described above. Accordingly, it is possible to provide the act of acquisition of power-up items with a strategic feature, thereby further enhancing the entertaining feature of the game.

Figures 12, 13:
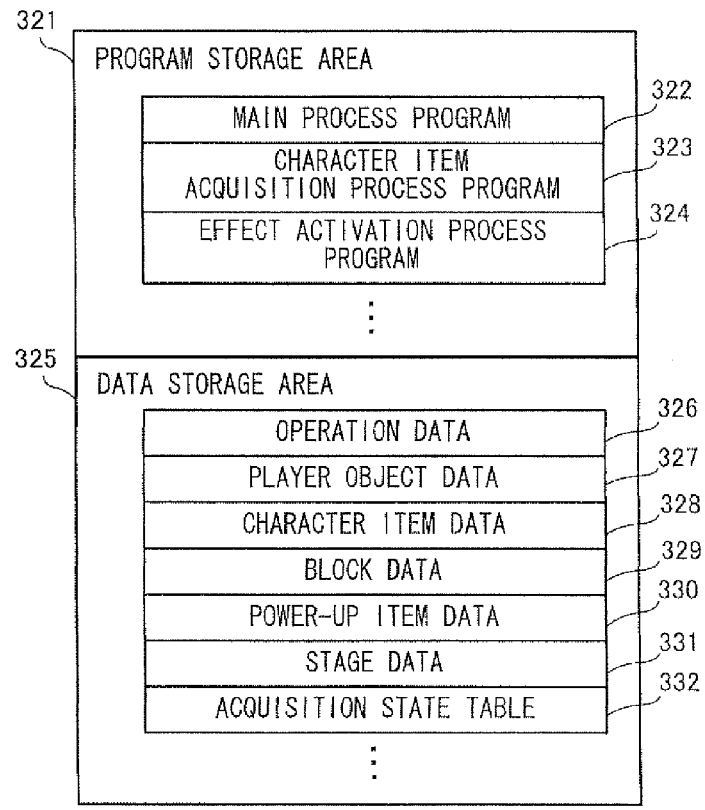
FIG. 12 illustrates a memory map of a main memory 32.
FIG. 13 shows an example of a data structure of power-up item data 330.

FIG. 12 illustrates a memory map of the main memory 32 shown in FIG. 2. In FIG. 12, the main memory 32 includes a program storage area 321 and a data storage area 325. Data in the program storage area 321 and the data storage area 325 in the main memory 32 are those obtained by copying data previously stored in the cartridge 29. The program storage area 321 stores a game program executed by the CPU 31. The game program includes a main process program 322, a character item acquisition process program 323, an effect activation process program 324, and the like.

The data storage area 325 stores data, such as operation data 326, player object data 327, character item data 328, block data 329, power-up item data 330, stage data 331, and an acquisition state table 332.

The operation data 326 is data that is generated when various operation buttons, such as the direction input button 14A and the operation button 14B, and the touch panel 13 are operated by the player, and that is indicative of the content of the performed operations. In the present embodiment, the main memory 32 may store only the latest operation data.

The player object data 327 is data regarding the player object. That is, the player object data 327 contains image data of the head part 101$h$, image data of the body part 101$b$ and the tail part 101$t$, data indicating the length of the body part 101$b$ and the tail part 101$t$, and the like.

The character item data 328 is source data of the character items 103 that appear/are displayed on the play screen. The character item data 328 contains image data and the like of fifteen kinds of character items described above.

The block data 329 is source data of the above-described blocks 102 that appear/are displayed on the play screen. The block data 329 contains image data and the like of the blocks 102. Also, a table allowing the CPU to recognize at the start of a game session of each stage the blocks that will appear on the stage is appropriately generated and stored as a part of the block data 329. The table contains data indicating whether the blocks are in the "non-burning state" or in the "burning state".

The power-up item data 330 is data regarding the character string objects 105, that is, power-up items, displayed on the item screen shown in FIG. 4 and the like. FIG. 13 shows an example of the data structure of the power-up item data 330. The power-up item data 330 contains sets of an ID 3301, effect type data 3302, an in-effect flag 3303, constituent character string data 3304, and effect content definition data 3305.

The ID 3301 is an ID for uniquely identifying a power-up item. The effect type data 3302 is data indicating the activation pattern and the duration type of the effect of each power-up item. To be specific, data indicating one of the three types of "instant activation and continuing type", "manual activation and temporary type", and "instant activation and temporary type" is stored.

The in-effect flag 3303 is a flag indicating whether the effect of each power-up item is already effective or ready to be activated. In other words, the in-effect flag 3303 is a flag indicating whether or not all the constituent characters of the character string representing a power-up item have been collected. When the flag is set to "OFF", it means that the character string has not been completed. When all the constituent characters of the character string have been collected, the flag is set to "ON".

The constituent character string data 3304 is data defining the details of a character string representing a character string object 105 corresponding to each power-up item.

The effect content definition data 3305 is data defining the content of the effect of each power-up item. With reference to the data, the CPU 31 performs various kinds of processes representing the effect of each power-up item.

The stage data 331 defines arrangement positions of the blocks 102 in each stage. The stage data 331 is the data used for forming each stage. Also, the stage data 331 contains data regarding the frequency of appearance, the number, and the positions of the fifteen kinds of character items 103 that appear in each stage.

With reference back to FIG. 12, the acquisition state table 332 is a table for indicating the acquisition state of the character items 103 and for indicating the relationship between the characters indicated by the obtained character items 103 and a character string object 105. FIG. 14 shows an example of the configuration of the acquisition state table 332. The acquisition state table 332 shown in FIG. 14 is configured to have an ID 3321, constituent character data 3322, and an acquisition flag 3323.

The ID 3321 is an ID for identifying the power-up item described above and corresponds to the ID 3301 of the power-up item data 330. The constituent character data 3322 is data indicating the characters that are constituents of a power-up item (that is, a character string object 105). The acquisition flag 3323 is a flag indicating the acquisition state of each constituent character. The flag "0" means that the corresponding constituent character has not been obtained. The flag "1" means that the corresponding constituent character has been obtained.

Figure 15:
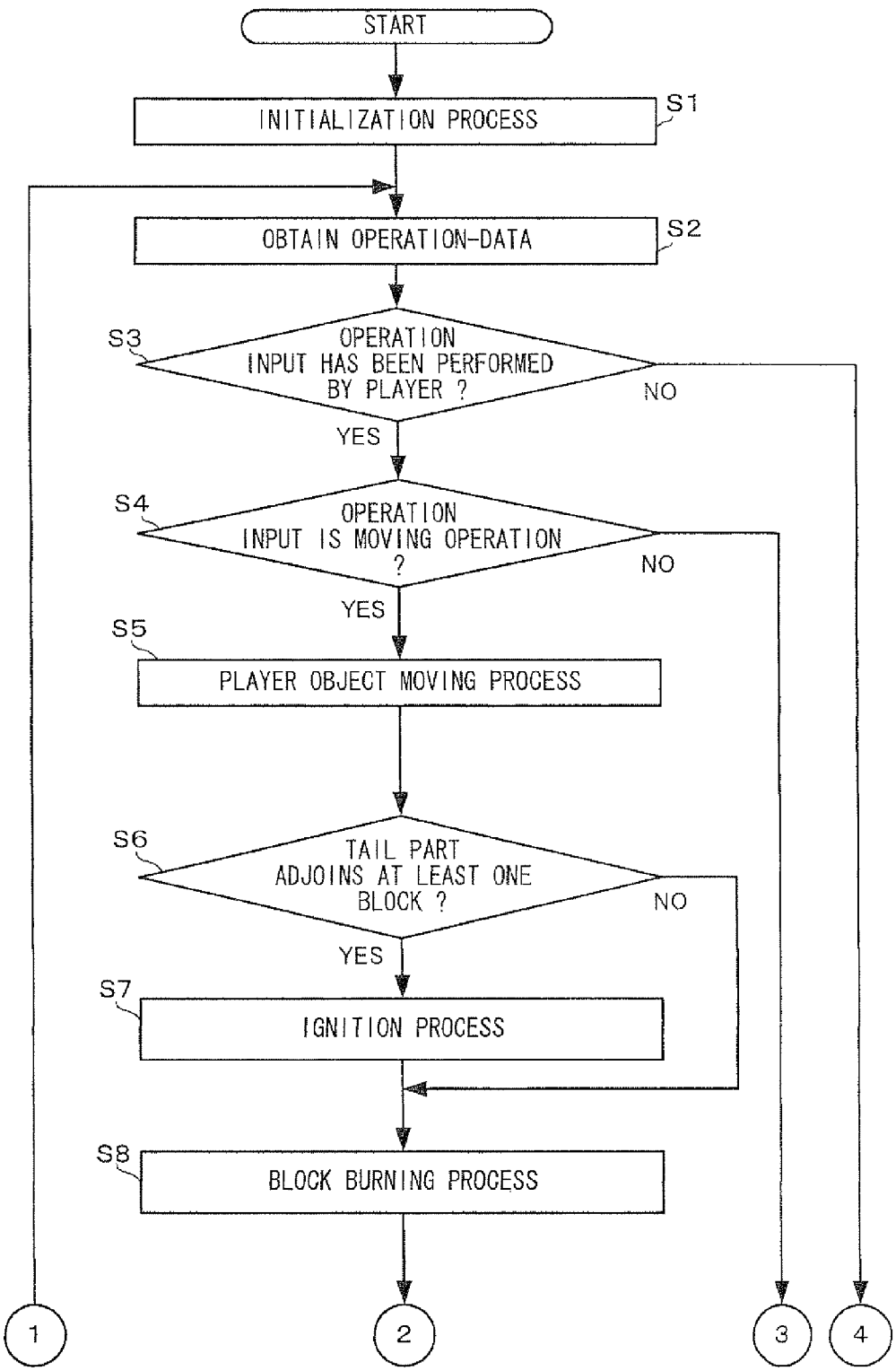
FIG. 15 is a flow chart showing game processing performed by the game apparatus 1.
Figure 16:
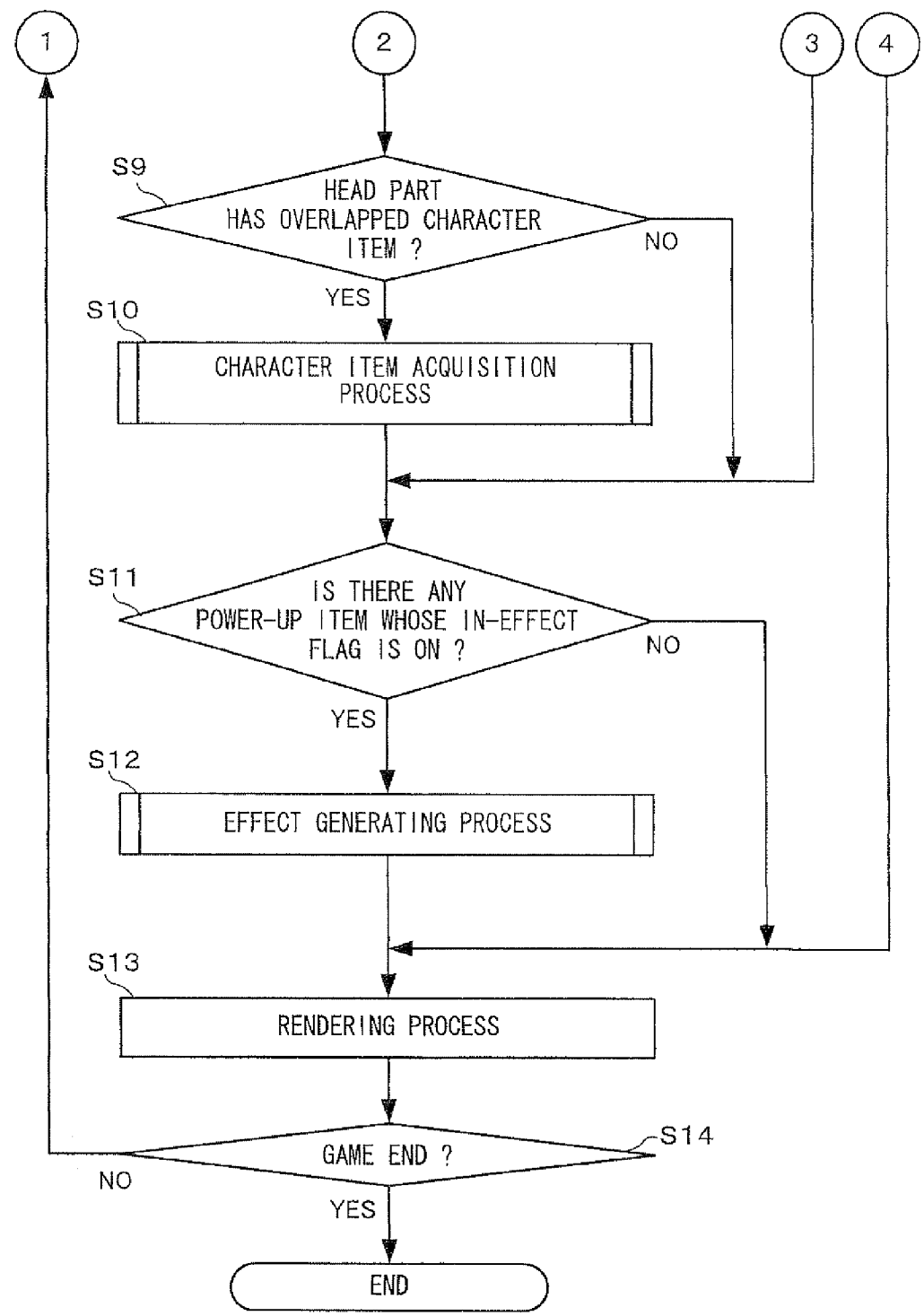
FIG. 16 is a flow chart showing the game processing performed by the game apparatus 1.

Next, the flow of the game processing performed by the game apparatus 1 is described with reference to FIG. 15 to FIG. 18. Each of FIG. 15 and FIG. 16 is a flow chart showing the game processing performed by the game apparatus 1. When the power of the game apparatus 1 is turned on, the CPU 31 of the game apparatus 1 performs a start-up program stored in a boot ROM not shown, and each unit of the main memory 32 and the like is initialized. Then, the game program stored in the cartridge 29 is loaded into the main memory 32, and execution of the game program is started. As a result, game images are displayed on the upper LCD 22 and the lower LCD 12, respectively, and the game is started.

First, an initialization process is performed in step S1. To be specific, initialization of data and variables used in the subsequent processing is performed. Moreover, various blocks 102, character items 103, and a player object 101 are arranged in a virtual game space based on the stage data 331, and a stage on which the game is played is created. Then, a game image displaying the starting point of the stage is generated, and the generated game image is displayed on a second LCD 12 as the play screen described above. Further, character string objects 105 described above are generated based on the constituent character string data 3304 contained in the power-up item data 330. Then, an item screen where the character string objects 105 are arranged, as shown in FIG. 4 and the like, is generated and displayed on a first LCD 22. Thereafter, the game advances as the process loop from steps S2 to S14 is repeated per frame.

Next, operation data 326 is obtained in step S2. In step S3, based on the operation data 326, it is determined whether or not an operation input has been performed by the player. As a result, when it is determined that the operation input has not been performed (NO in step S3), the processing proceeds to step S12 described below, and a game screen rendering process is performed. That is, while no operation input is performed by the player, the same game screen continues to be displayed, and the game is in a state where the time in the game has stopped.

Meanwhile, as a result of the determination in step S3, it is determined whether or not any operation input has been performed by the player. When it is determined that an operation input has been performed (YES in step S3), then, in step S4, whether or not the operation input is an operation for moving the player object 101, to be specific, whether or not the operation input is an operation of pressing the cross button 14A. As a result, when it is determined that the operation input is not the moving operation (NO in step S4), the processing proceeds to step S11 described below. Meanwhile, when it is determined that the operation input is the moving operation (YES in step S4), then, in step S5, a process for moving the player object 101 is performed. To be specific, first, based on the operation data 326 obtained in step S2, a process for moving the head part 101h of the player object 101 in the virtual game space is performed. Then, a process for moving the body part 101b and the tail part 101t in such a manner as to follow the head part 101h is performed.

Next, in step S6, it is determined whether or not the moved body part 101b or the moved tail part 101t adjoins at least one block 102. As a result of the determination, when the body part 101b or the tail part 101t adjoins any one of the blocks 102, an ignition process is performed in the subsequent step S7. In the ignition process, among the blocks 102 adjoined by the body part 101b or the tail part 101t, onto a block 102 in the non-burning state (that is, the block 102 not ignited yet), a process for causing the block 102 to be in the burning state (that is, a process for igniting the block 102) is performed.

Meanwhile, as a result of the determination in step S6, when neither of the body part 101b or the tail part 101t adjoins any one of the blocks 102 (NO in step S6), the process of step S7 is skipped, and the processing proceeds to step S8 described below.

Next, a block burning process is performed in step S8. In this process, with respect to the block 102 in the burning state, a process for displaying a representation (animation and the like) of the burning state is performed. Moreover, with respect to a block 102 for which a predetermined period of time has elapsed since the block 102 has entered the burning state, a process for causing the block 102 to disappear from the play screen (the virtual game space) is also performed.

Next, in step S9 of FIG. 16, it is determined whether or not the moved head part 101h has come to a position at which the head part 101h overlaps a character item 103. As a result, when the head part 101h does not overlap any character item 103 (NO in step S9), the processing proceeds to step S11 described below.

Figure 17:
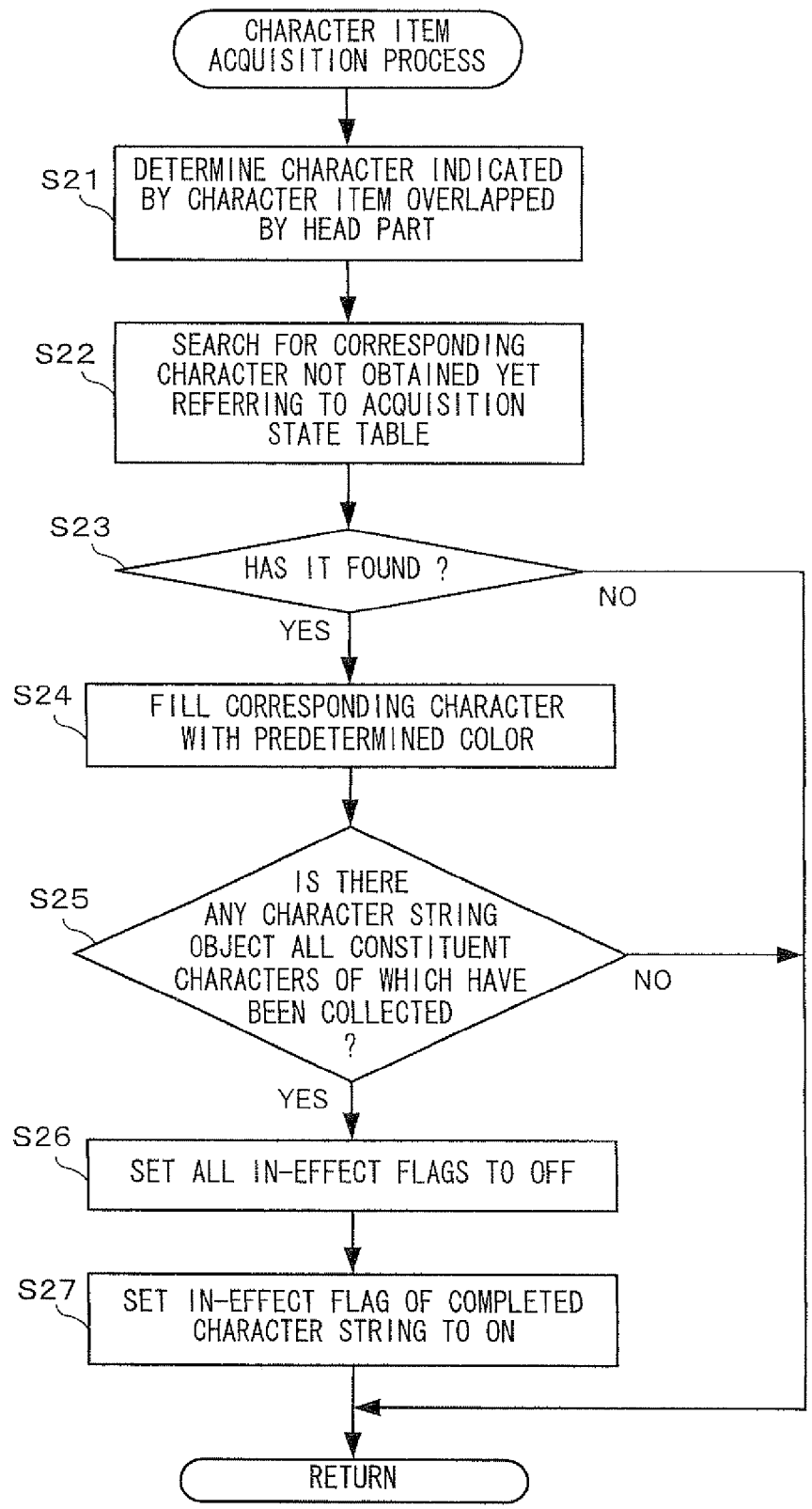
FIG. 17 is a flow chart showing in detail a character item acquisition process of step S10 shown in FIG. 16.

On the other hand, when it is determined that the head part 101h overlaps a character item (YES in step S9), a character item acquisition process is performed in step S10. FIG. 17 is a flow chart showing in detail the character item acquisition process of step S10. With reference to FIG. 17, first, in step S21, the character indicated by the character item 103 which is overlapped by the head part 101h (hereinafter referred to as an obtained character) is determined.

Next, in step S22, with reference to the acquisition state table 332, a process for searching for a piece of constituent character data 3322 that corresponds to the same constituent character as the obtained character and whose acquisition flag 3323 is "0". To be specific, with reference to the example of the acquisition state table 332 shown in FIG. 14, a process is performed in which the constituent character data 3322 in FIG. 14 is scanned in order from the left end to the right and a piece of the constituent character data 3322 that corresponds to the same character as the obtained character and whose acquisition flag 3323 is "0" is searched for.

Next, in step S23, after a result of the search, it is determined whether or not the piece of the constituent character data 3322 that corresponds to the same character as the obtained character and whose acquisition flag 3323 is "0" has been found. As a result, when the piece of the constituent character data 3322 that corresponds to the same character as the obtained character and whose acquisition flag 3323 is "0" has not been found (NO in step S23), the character item acquisition process ends. On the other hand, when the piece of the constituent character data 3322 that corresponds to the same character as the obtained character and whose acquisition flag 3323 is "0" has been found (YES in step 323), the acquisition flag 3323 of the piece of the constituent character data 3322 is set to "1" in the subsequent step S24. In addition, a process is performed in which: the character string object 105 to which the above piece of the constituent character data 3322 belongs is identified based on the ID 3321 and the ID 3301 of the power-up item data 330, and the corresponding character in the character string object 105 is filled with a predetermined color.

To be specific, in steps S21 to S24, processes are performed in which: the acquisition state table 332 is searched from the left to the right for a piece of the constituent character data 3322 that corresponds to the same character as the obtained character and whose acquisition flag 3323 is "0", and then the acquisition flag of the piece of the constituent character data 3322 that has been found first is set to "1". Then, performed is a process for filling a character in the character string object 105, the character corresponding to the found piece of the constituent character data 3322, thereby indicating to the player that the character has been obtained.

Next, in step 25, it is determined whether or not all the constituent characters of any character string object 105 have been obtained. In other words, it is determined whether or not there is an ID 3321 all the acquisition flags 3323 of which are set to "1". When such an ID 3321 exists, it is considered that a power-up item corresponding to the ID 3321 (character string object 105) has been obtained. As a result of the determination in step S25, when it is determined there is no character string object 105 all the constituent characters of which have been obtained (NO in step S25), the character item acquisition process ends.

On the other hand, when it is determined that there is a character string object 105 all the constituent characters of which have been obtained (YES in step S25), then, in step S26, all the in-effect flags 3303 in the power-up item data 330 are set to "OFF". Then, in step S27, the in-effect flag 3303 of the power-up item obtained this time (identified based on the ID 3321 in the acquisition state table 332 and the ID 3301 of the power-up item data 330) is set to "ON". This is the end of the character item acquisition process.

With reference back to FIG. 16, after the character item acquisition process, it is determined in step S11 whether or not there is a power-up item whose in-effect flag 3303 is set to "ON" with reference to the power-up item data 330. As a result, when it is determined that such a power-up item does not exist (NO in step S11), the processing proceeds to step S13 described below.

Figure 18:
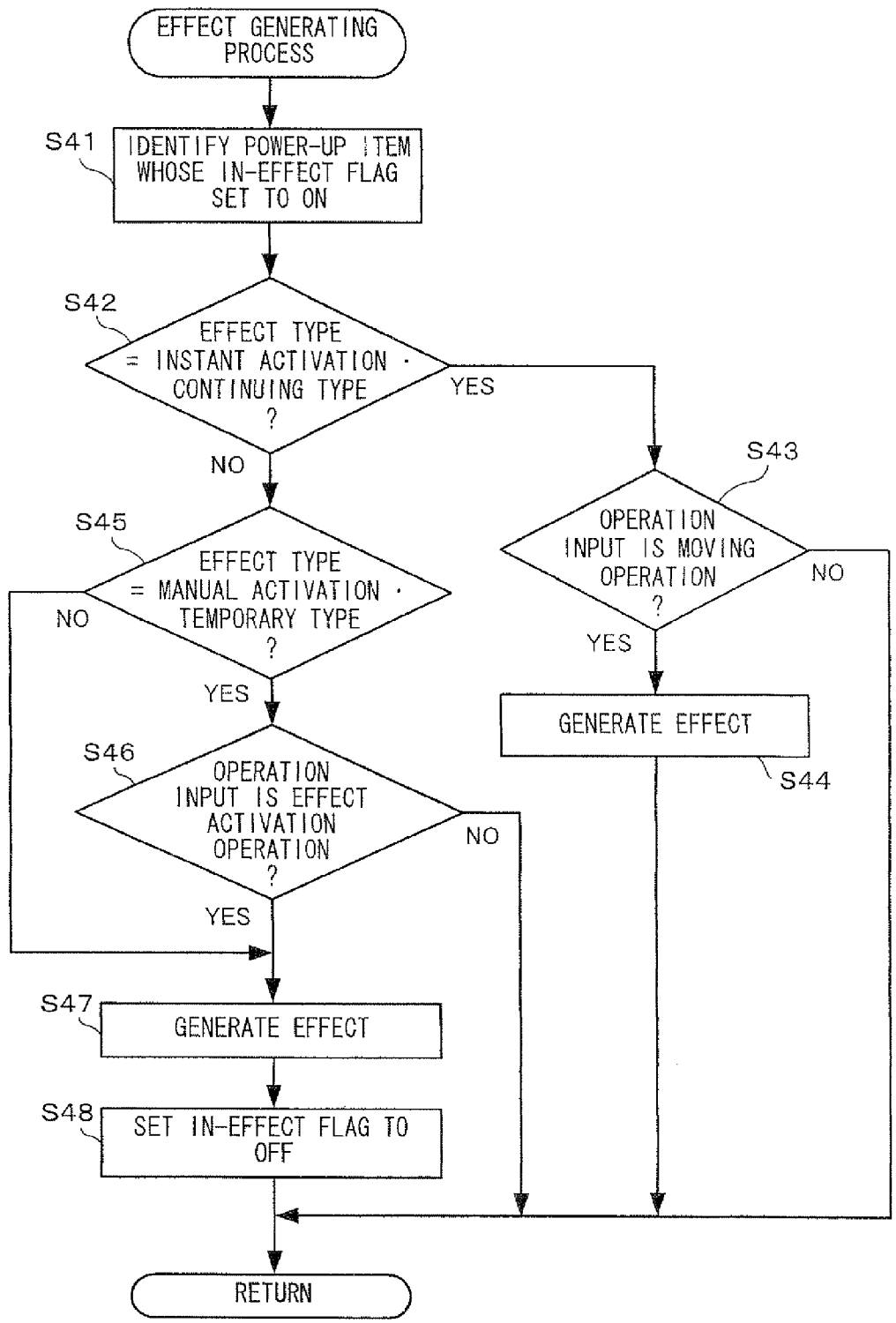
FIG. 18 is a flow chart showing in detail an effect generating process of step S12 shown in FIG. 16.

On the other hand, when it is determined that there is a power-up item whose in-effect flag 3303 is set to "ON" (YES in step S11), an effect generating process is performed in step S12. FIG. 18 is a flow chart showing in detail the effect generating process of step S12. With reference to FIG. 18, first, in step S41, a process is performed in which the power-up item whose in-effect flag 3303 is set to "ON" is identified with reference to the power-up item data 330. For example, the ID 3301 whose in-effect flag 3303 is set to "ON" is identified.

Next, in step S42, with reference to the effect type data 3302 of the identified power-up item, it is determined whether or not the effect type data 3302 is the "instant activation and continuing type". As a result of the determination, when it is determined that the effect type data 3302 is the "instant activation and continuing type" (YES in step S42), it is determined in step S43 whether or not the operation input is the operation for moving the player object 101 with reference to the operation data 326 obtained in step S2. As a result, when it is determined that the operation input is the operation for moving the player object 101 (YES in step S43), then, in step S44, a process is performed in which an effect corresponding to the power-up item is generated with reference to the effect content definition data 3305. On the other hand, when it is determined that the operation input is not the operation for moving the player object 101 (NO in step S43), the effect generating process ends. For example, in a state where the effect of the power-up item of the continuing type is effective, even if the operation button assigned to the activation operation is pressed, the pressing operation is treated in the same manner as the case where no operation is performed, and thus, the time in the game does not advance.

Meanwhile, as a result of the determination in step S42, when it is determined that the effect type data 3302 is not the "instant activation and continuing type" (NO in step S42), then, in step S45, it is determined whether or not the effect type data 3302 is the "manual activation and temporary type". As a result, when it is determined that the effect type data 3302 is not the "manual activation and temporary type" (NO in step S45), it is considered that a power-up item of the "instant activation and temporary type" has been obtained. Accordingly, the processing proceeds to step S47.

On the other hand, when it is determined that the effect type data 3302 is the "manual activation and temporary type" (YES in step S45), then, in step S46, it is determined whether or not the operation input is an operation for effect activation (for example, pressing the operation button 140) with reference to the operation data 326 obtained in step S2. As a result, when it is determined that the operation input is not the operation for effect activation (NO in step S46), the effect generating process ends. That is, the player object enters the state where the power-up item has been obtained but activation of the effect has been suspended.

On the other hand, when it is determined that the operation input is the operation for effect activation (YES in step S46), then, in step S47, a process is performed in which the effect corresponding to the power-up item is generated with reference to the effect content definition data 3305. Also, when it is determined in step S45 that the effect type data 3302 is not the "manual activation and temporary type" (that is, when the power-up item of "instant activation and temporary type" is obtained), the above process is performed. That is, with respect to the power-up item of the "instant activation and temporary type", at the time when all the constituent characters thereof have been collected, the effect is activated instantly.

Next, in step S48, the in-effect flag 3303 of the obtained power-up item is set to "OFF". That is, with respect to the power-up items of the "manual activation and temporary type" and of the "instant activation and temporary type", at the time when the effect thereof is activated, the in-effect flag 3303 is set to "OFF". This is the end of the effect generating process.

With reference back to FIG. 16, after the effect generating process, various types of game processing (not shown), such as a score addition process, are performed, and a game screen rendering process is performed in step S13. Next, in step S14, it is determined whether or not to end the game. In the case of YES, the game processing ends. In the case of NO, the game processing returns to step S2 and is repeated. This is the end of the description of the game processing according to the present embodiment.

As described above, the present embodiment allows the player to obtain a power-up item by collecting constituent characters one by one until the player has collected all the constituent characters of a character string object 105. Moreover, the present embodiment is configured such that a common character is used in a plurality of character string objects 105. Also, the acquisition state of the constituent characters are visually indicated to the player by the display on the item screen described above. Accordingly, it is possible to provide the act of acquisition of power-up items with a strategic feature, thereby allowing enhancement of the entertaining feature of the game.

In addition, the difficulty level of collecting common characters is adjusted by arranging the character string objects 105 in the manner as described above. To be specific, the lower a character string object 105 is located, the more difficult it becomes to collect the constituent characters thereof. This provides the game with a strategic feature, thereby enhancing the entertaining feature of the game. For example, it is possible to provide a highly strategic manner of enjoying the game, in which the player intentionally avoids obtaining the last character to complete a character string object 105. In other words, the player advances the game while maintaining the state where the effect can be activated only if the last character is obtained and avoiding obtaining unnecessary character item 103; and then, the player obtains the last character at a scene where the last character is necessary, and activates the effect. In this manner, it is possible to provide a manner of enjoying the game having a strategic feature in the act of acquisition of power-up items. Moreover, it is possible to provide a still strategic manner of enjoying the game in which, for example, when leaving the last character, the player does not choose any constituent character as the last constituent but choose the character that relatively often appears and avoids obtaining the character.

Note that the above embodiment describes an example where only the character items 103 appear in the play screen as the game items. However, the present invention is not limited thereto. Other items may also be caused to appear among the game items the collection of which allows acquisition of a power-up item. For example, in addition to the character items, an item that raises, when obtained, the rate of multiplying the score (hereinafter referred to as a multiplying item) and accordingly allows the player to get a high score, may be caused to appear. Further, "ZAPALL", which is one of the power-up items described above, may also have an effect of causing such a multiplying item to disappear. For example, a state is assumed where "ZAPALL" can be activated only if one more character is collected. In such a state, for example, if a character item 103 to be the last character and a multiplying item appear approximately in the same period of the game session, it would be more strategic to obtain the multiplying item first and then the last character. This provides the player with a more strategic manner of playing the game, thereby allowing enhancement of the entertaining feature of the game.

Figure 19:
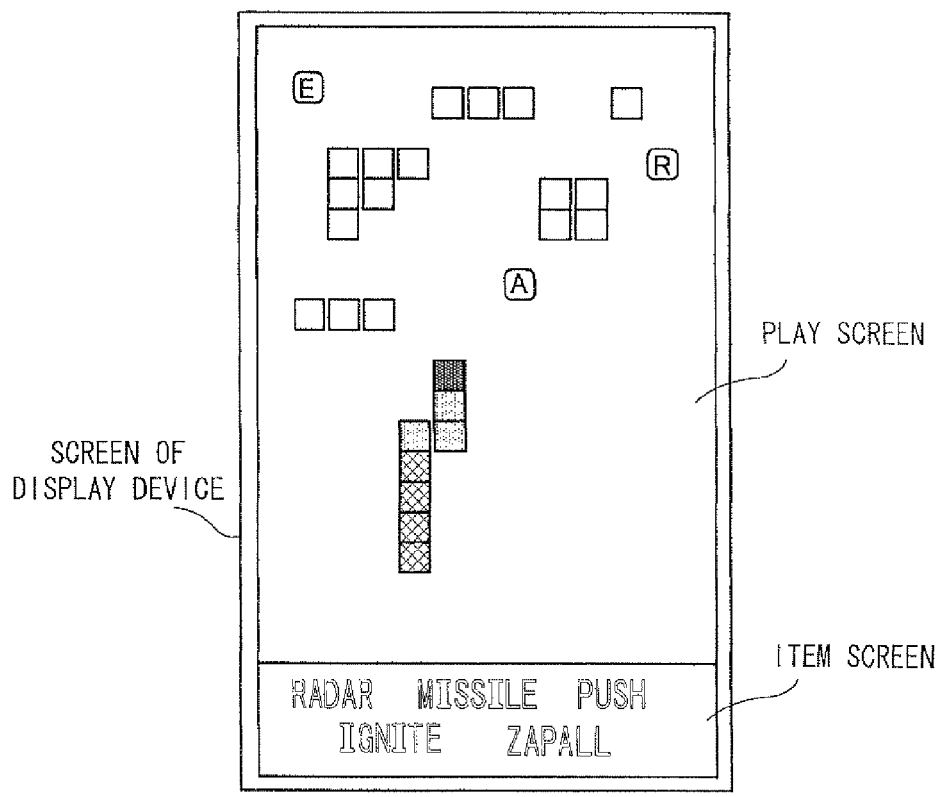
FIG. 19 shows an example where a play screen and the item screen are displayed in one screen.
Figure 20:
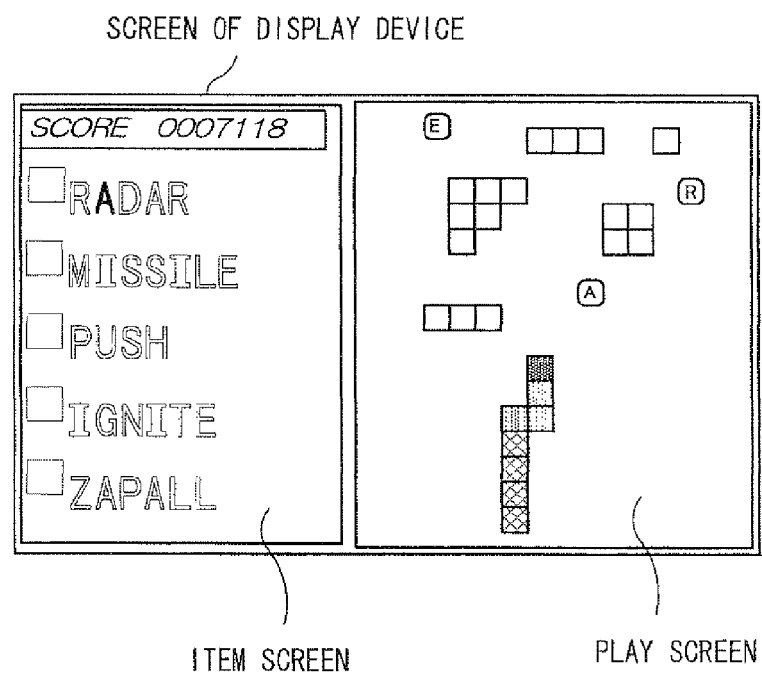
FIG. 20 shows an example where the play screen and the item screen are displayed in one screen.

In the embodiment described above, the item screen and the play screen are displayed in physically different screens (upper LCD 22 and lower LCD 12), respectively. However, the present invention is not limited thereto. The item screen and the play screen may be displayed in physically one screen. For example, when a vertically long display as shown in FIG. 19 is used, the display area thereof may be divided into upper and lower display areas. Then, the play screen is set in the upper display area accounting for about ninety percent of the whole display area, and the item screen is set in the lower display area accounting for about ten percent of the whole display area. In this manner, the play screen and the item screen may be displayed in one screen. Alternatively, as shown in FIG. 20, when a horizontally long screen is used, the display area thereof may be divided into left and right display areas. In this manner, the play screen and the item screen may be displayed in one screen.

Desirably, the item screen is always displayed as in the above-described embodiment from a view point that the player can promptly know the acquisition state of the character items. However, the present invention is not limited thereto. The item screen may not be displayed in usual game sessions, but may be displayed as appropriate in response to the operation performed by the player.

With respect to the constituent characters, the above embodiment describes an example where English alphabet is used. As in the embodiment, each character string formed by a combination of alphabet characters represents a word having a meaning (alternatively, the meaning thereof is easily understood by the player, such as "ZAPALL" in the above example). This is advantageous in that the player easily understands the effect of the character string. However, the present invention is not limited to the alphabet, and may use other characters of another language. Moreover, numerals and symbols may be used. For example, the symbols may be various mathematical symbols or punctuation marks, such as "!". Moreover, original symbols created by a game developer may be used. For example, symbols representing six elements of "fire", "water", "wind", "earth", "light", and "darkness", respectively, are defined and created in advance. Then, the power-up items (character string objects 105) are defined by using combinations of these six symbols as well as the concept of the "common character" described above. On the play screen, items indicating these six symbols, respectively, may be caused to appear as character items 103 described above.

The above embodiment describes an example of a hand-held game device. However, the present technology is also applicable to stationary game apparatuses, various personal digital assistants and personal computers that execute a game program, and the like.

With respect to the process at the time when common characters are obtained, the above embodiment describes an example where the common characters are filled one by one in order from the top to the bottom of the screen. However, alternatively, a process may be performed in which common characters are filled one by one at random. Addition of such a random element can provide a variation in the manner of playing the game.

While the example embodiments presented herein have been described in detail, the foregoing description is in all aspects illustrative and not restrictive. It is understood that numerous other modifications and variations can be devised without departing from the scope of the embodiments.

What is claimed is:

1. A non-transitory computer-readable storage medium having stored thereon a game program executed by a computer of a game apparatus which causes a player object to move based on an operation by a player, the game program causing the computer to execute operations comprising:

displaying on a predetermined display device a play screen on which a virtual game space is rendered, the virtual game space containing character items indicating a predetermined character and the player object;

displaying a character string object screen on which character string objects are displayed, each of the character string objects formed in advance as a combination of characters indicated by the character items displayed on the play screen;

performing, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen;

determining, with respect to one of the character string objects displayed on the character string object screen, whether or not all constituent characters thereof have been obtained, the constituent characters being characters forming said one of the character string objects; and performing, when all the constituent characters of said one of the character string objects have been obtained, an effect generating process that is predefined as a game effect corresponding to said one of the character string objects, wherein the constituent characters of each of the character string objects include a common character which is a character used in common in at least two of the character string objects; and when the player object has obtained one of the character items that indicates the common character, the computer performs, onto one of the common characters that correspond to said one of the character items obtained, a process for indicating that the character indicated by said one of the character items has been obtained, in an order predefined based on positions of the character string objects arranged on the character string object screen, wherein the character string objects are arranged in a longitudinal direction on the character string object screen; and when the player object has obtained said one of the character items that indicates the common character, the computer performs, onto said one of the common characters that correspond to said one of the character items obtained, a process for indicating that the character indicated by said one of the character items has been obtained, in an order in which the common characters are processed one by one from the top to the bottom of the character string object screen, wherein the character string objects are associated with a process having a definition that an object to which the common character is assigned with a lower priority is defined as exerting a stronger effect.

2. The non-transitory computer-readable storage medium having stored thereon the game program according to claim 1, wherein the computer performs, when the player object contacts one of the character items in the virtual game space, a process for indicating that the character indicated by said one of the character items has been obtained.

3. The non-transitory computer-readable storage medium having stored thereon the game program according to claim 1, wherein the character string object screen is always displayed.

4. The non-transitory computer-readable storage medium having stored thereon the game program according to claim 3, the character string object screen is always displayed on a display device different from the display device on which the play screen is displayed.

5. The non-transitory computer-readable storage medium having stored thereon the game program according to claim 1, wherein the computer performs a process for changing a display state of the same character as the character indicated by said one of the character items that has been obtained by the player object, the same character being among the constituent characters displayed on the character string object screen, the process being performed as the process for indicating that the character indicated by said one of the character items has been obtained.

6. The non-transitory computer-readable storage medium having stored thereon the game program according to claim 5, wherein the computer performs a process for changing a color indicating that the same character as the character indicated by said one of the character items that has been obtained by the player object, the same character being among the constituent characters displayed on the character string object screen, the process being performed as the process for indicating that the character indicated by said one of the character items has been obtained.

7. The non-transitory computer-readable storage medium having stored thereon the game program according to claim 1, wherein each of the character string objects is associated with one of instant generation information and manual generation information, the instant generation information indicating that the effect generating process is performed immediately after the computer has determined that all the constituent characters of one of the character string objects have been obtained, the manual generation information indicating that the effect generating process is performed when a predetermined operation is performed by the player after the computer has determined that all the constituent characters of one of the character string objects have been obtained;

the computer determines, when all the constituent characters of said one of the character string objects have been obtained, whether information associated with said one of the character string objects is the instant generation information or the manual generation information, and immediately performs the effect generating process in a case where the information is the instant generation information, and performs, in a case where the information is the manual generation information, the effect generating process when a predetermined operation is performed by the player.

8. The non-transitory computer-readable storage medium having stored thereon the game program according to claim 7, wherein after the computer has determined that all the constituent characters of said one of the character string objects have been obtained, in the case where the information associated with said one of the character string objects is the manual generation information, when all constituent characters of another one of the character string objects different from said one of the character string objects have been obtained before the predetermined operation is performed by the player, the computer performs the effect generating process corresponding to said another one of the character string objects.

9. The non-transitory computer-readable storage medium having stored thereon the game program according to claim 1, wherein each of the character string objects is associated with one of a first effect process and a second effect process, the first effect process defined as a process whose game effect continues, after being generated, until all constituent characters of another one of the character string objects have been obtained, the second effect process defined as a process whose game effect, after being generated, does not continue and disappears soon; and the computer performs one of the first effect process and the second effect process as the effect generating process corresponding to said one of the character string objects, all the constituent characters thereof having been obtained.

10. The non-transitory computer-readable storage medium according to claim 1, wherein
the character string objects are associated with a process having a definition that the lower one of the character string objects is located on the character string object screen, the stronger game effect said one of the character string objects has.

11. A game apparatus which causes a player object to move based on an operation by a player, the game apparatus comprising:
a play screen display unit for displaying on a predetermined display device a play screen on which a virtual game space is rendered, the virtual game space containing character items indicating a predetermined character and the player object;
a character string object screen display unit for displaying a character string object screen on which character string objects are displayed, each of the character string objects formed in advance as a combination of characters indicated by the character items displayed on the play screen;
an acquisition state reflection unit for performing, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen;
a character string completion determination unit for determining, with respect to one of the character string objects displayed on the character string object screen, whether or not all constituent characters thereof have been obtained, the constituent characters being characters forming said one of the character string objects; and
an effect process performing unit for performing, when the character string completion determination unit has determined that all the constituent characters of said one of the character string objects have been obtained, an effect generating process that is predefined as a game effect corresponding to said one of the character string objects, wherein
the constituent characters of each of the character string objects include a common character which is a character used in common in at least two of the character string objects; and
when the player object has obtained one of the character items that indicates the common character, the acquisition state reflection unit performs, onto one of the common characters that correspond to said one of the character items obtained, a process for indicating that the character indicated by said one of the character items has been obtained, in an order predefined based on positions of the character string objects arranged on the character string object screen, wherein
the character string objects are arranged in a longitudinal direction on the character string object screen; and
when the player object has obtained said one of the character items that indicates the common character, the acquisition state reflection unit performs, onto said one of the common characters that correspond to said one of the character items obtained, a process for indicating that the character indicated by said one of the character items has been obtained, in an order in which the common characters are processed one by one from the top to the bottom of the character string object screen, wherein
the character string objects are associated with a process having a definition that an object to which the common character is assigned with a lower priority is defined as exerting a stronger effect.

12. The game apparatus according to claim 11, wherein
the character string objects are associated with a process having a definition that the lower one of the character string objects is located on the character string object screen, the stronger game effect said one of the character string objects has.

13. A computer-implemented game control method for controlling a game which causes a player object to move based on an operation by a player, the method comprising:
displaying on a predetermined display device a play screen on which a virtual game space is rendered, the virtual game space containing character items indicating a predetermined character and the player object;
displaying a character string object screen on which character string objects are displayed, each of the character string objects formed in advance as a combination of characters indicated by the character items displayed on the play screen;
performing, via one or more computer processing devices, when the player object has obtained one of the character items in the virtual game space, a process onto a same character as a character indicated by said one of the character items that has been obtained, the process being for indicating that the character indicated by said one of the character items has been obtained, the same character being among characters of character strings displayed on the character string object screen;
determining, via the one or more computer processing devices, with respect to one of the character string objects displayed on the character string object screen, whether or not all constituent characters thereof have been obtained, the constituent characters being characters forming said one of the character string objects; and
performing, via the one or more computer processing devices, when the character string completion determination has determined that all the constituent characters of said one of the character string objects have been obtained, an effect generating process that is predefined as a game effect corresponding to said one of the character string objects, wherein
the constituent characters of each of the character string objects include a common character which is a character used in common in at least two of the character string objects; and
when the player object has obtained one of the character items that indicates the common character, a process is performed onto one of the common characters that correspond to said one of the character items obtained, for indicating that the character indicated by said one of the character items has been obtained, in an order predefined based on positions of the character string objects arranged on the character string object screen, wherein
the character string objects are arranged in a longitudinal direction on the character string object screen; and
when the player object has obtained said one of the character items that indicates the common character, a process is performed onto said one of the common characters that correspond to said one of the character items obtained, for indicating that the character indicated by said one of the character items has been obtained, in an order in which the common characters are processed one by one from the top to the bottom of the character string object screen, wherein the character string objects are associated with a process having a definition that an object to which the common character is assigned with a lower priority is defined as exerting a stronger effect.

14. The computer-implemented game control method according to claim 13, wherein the character string objects are associated with a process having a definition that the lower one of the character string objects is located on the character string object screen, the stronger game effect said one of the character string objects has.

* * * * *